(12) United States Patent
Trask

(10) Patent No.: US 6,981,135 B1
(45) Date of Patent: Dec. 27, 2005

(54) SYSTEM AND METHOD OF CONFIGURING SYSTEM COMPONENTS

(75) Inventor: Barrett Alan Trask, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 523 days.

(21) Appl. No.: 10/211,611

(22) Filed: Aug. 2, 2002

(51) Int. Cl.$^7$ ............................ G06F 9/24; G06F 9/445
(52) U.S. Cl. .............................................. 713/1; 713/2
(58) Field of Search ........................................ 713/1, 2

(56) References Cited

U.S. PATENT DOCUMENTS

| | | | |
|---|---|---|---|
| 5,835,775 A | * 11/1998 | Washington et al. | ......... 717/153 |
| 5,991,822 A | * 11/1999 | Mealey et al. | .............. 719/327 |
| 6,718,403 B2 | * 4/2004 | Davidson et al. | ............. 710/19 |

* cited by examiner

Primary Examiner—Lynne H. Browne
Assistant Examiner—Stefan Stoynov

(57) ABSTRACT

In a computer system, various pieces of hardware, such as a processor, may be replaced with newer or different models. The replacement may effect the communications between it and other components. The present system and method provides for configuring components so that they have settings more appropriate for the new hardware.

41 Claims, 10 Drawing Sheets

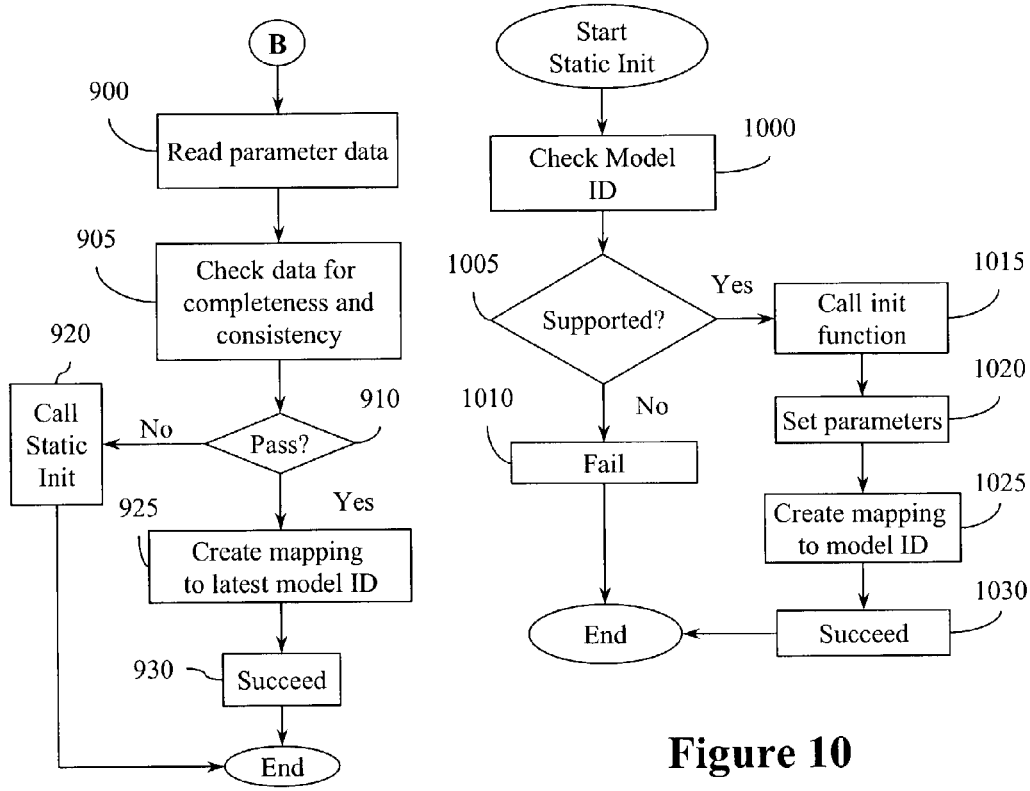
Figure 9
Figure 10
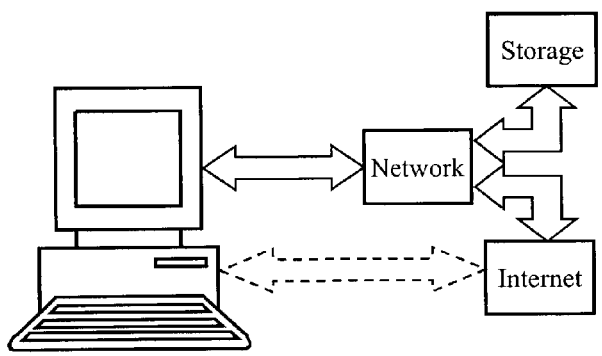
Figure 11

SYSTEM AND METHOD OF CONFIGURING SYSTEM COMPONENTS

BACKGROUND

Some components within computers, whether hardware and/or software, depend on being configured with certain configuration settings in order to optimally function with other components. When a component is replaced with a new/updated component, it may affect the ability of other components to interact with the new/updated component because the other components may not be properly configured to interact with its settings.

For example, a performance monitoring component, such as the "perfmon" system call used in the HP-UX operating system, may depend on specific register definitions and implementations when interacting with a processor, such as the Itanium line made by Intel. In particular, the Itanium has an embedded performance monitoring unit (PMU) that interacts with perfmon. The PMU can vary for each new model of the processor. To ensure optimal operation between perfmon and the PMU, perfmon should be initialized with configuration values that are specific for the processor model of the PMU. This requires foreknowledge of the PMU definition for each supported model of processor, if a software release to support the model is to be released on the same timeframe as the processor model. In prior art systems, the kernel and/or perfmon were re-configured for the new model by way of a kernel patch or source edit and rebuild. In some cases, a new operating system release would have to be performed to implement the new configurations so that perfmon could function with the new processor. This is typically time consuming and costly.

SUMMARY

In one embodiment, a computer readable medium is provided that includes one or more computer executable instructions for configuring a performance monitoring component of a computer system where the performance monitoring component is configured to communicate with a first processor but is to communicate with a second processor. The software product comprises first computer executable instructions that cause a computer to select one or more dynamic configuration parameters from a pre-generated set of dynamic configuration data based on an identity of the second processor. It further includes second computer executable instructions that cause a computer to re-configure the performance monitoring component with the selected one or more dynamic configuration parameters to improve communication with the second processor.

In accordance with another embodiment, a method of configuring a performance monitor of a computer that has a processor, where the performance monitor communicates with the processor based on a set of static configuration parameters is provided. The method includes obtaining a processor identifier that identifies the processor. Pre-generated dynamic configuration data having one or more dynamic configuration parameters associated with one or more types of processors is searched, where the dynamic configuration parameters are dynamically modifiable. A set of dynamic configuration parameters are selected from the pre-generated dynamic configuration data that is associated to the processor identifier. The performance monitor is dynamically re-configured with the set of dynamic configuration parameters by overwriting corresponding values of the static configuration parameters.

BRIEF DESCRIPTION OF THE DRAWINGS

FIG. 9 is a continuation of FIG. 8; and

FIG. 10 is an exemplary methodology of a static initialization called by the previous methodology.

FIG. 11 is an exemplary computer system architecture for implementing the various embodiment of FIGS. 1–10.

DESCRIPTION OF ILLUSTRATED EMBODIMENTS

The following includes definitions of exemplary terms used throughout the disclosure. Both singular and plural forms of all terms fall within each meaning:

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

"Signal", to one or more electrical signals, analog or digital signals, one or more computer instructions, a bit or bit stream, or the like.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User", as used herein, includes but is not limited to one or more persons, software, or computers.

In a general sense, the illustrated systems and methods take advantage of persistent storage of a computer to dynamically control and/or override initialization of a component based on configuration details of another piece of hardware that may be unpredictable and for which documentation may be lacking or inaccurate. Although the examples herein refer to a processor, the present system is readily applicable to other chip sets or other components that have changing performance related information or other variable configuration settings.

Figure 1:
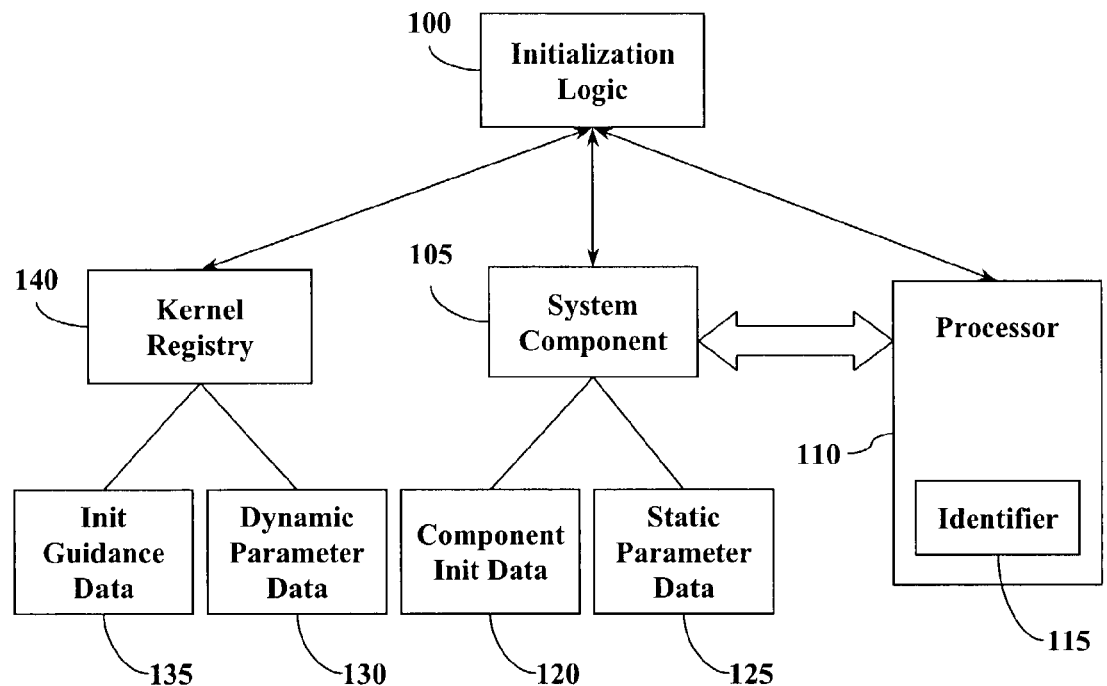
FIG. 1 is an exemplary overall system diagram of one embodiment of a configuration system.

Illustrated in FIG. 1 is an exemplary system diagram of one embodiment of a configuration system. The embodiment includes an initialization logic 100 that is responsible for dynamically initializing a system component 105 with configuration settings that are specific to a processor 110 in the computer system. For exemplary purposes, the foregoing discussion will be described in the context of a generic system component 105 that communicates with the processor 110. The system component 105 may be embodied as hardware, software or a combination of both. In one example, it may be a kernel module. Also, it is within the scope of this system that the processor 110 may be another type of chip or electronic device. It will be appreciated that the term initialization is also synonymous with the terms "configuration" and "re-configuration". That is, the embodiments described herein as initialization can also be used subsequent to initialization such as, for example, during any configuration or re-configuration.

In an exemplary scenario, the system component 105 is initially configured with a first set of configuration settings based on hardware definitions of the processor. However, if the processor is upgraded and/or replaced, the configuration settings for the system component 105 may no longer be appropriate for optimal communication with the new processor 110. In an extreme case, communication may no longer be possible between the system component 105 and the processor 110. At some point after the processor 110 is changed, the initialization logic 100 is triggered, for example during the next kernel boot, and attempts to automatically initialize the system component 105 with new configuration settings that are specific to the processor type. The new configuration settings, if successful, should improve the communication between the components. It will be appreciated that the term "improve communication" is generally used to include a wide range of situations including allowing communication between components when previously it was lost, to optimizing existing communications between components.

The initialization logic 100 attempts to obtain identification information from the processor 110 so that the system component 105 is correctly initialized. For example, certain types of processors may have an identifier 115 embedded within the processor. The identifier 115 may be stored, for example, in a register. The identifier 115 may have one or more levels of identification such as a processor family name, model, and/or other subtypes. These may be separate pieces of information and/or may be concatenated together in one identifier. With the identifier 115, the initialization logic 100 attempts to initialize the system component 105 with initialization parameters that are associated to the type of processor based on the identifier 115. The parameters actually used to initialize the system component 105 are represented by component initialization parameters 120 which are selected during the initialization process.

The selection of initialization parameters is made from a set of static parameter data 125, a set of dynamic parameter data 130, or both. The static parameter data 125 includes initialization data that is statically compiled into the kernel and is contained within the system component 105. The dynamic parameter data 130 includes initialization data that can be changed at run time. Also, a set of initialization guidance data 135 may be included that can be used to guide the initialization logic 100 to determine which one of the sets of static parameter data 125 to select. In this embodiment, the dynamic parameter data 130 and the initialization guidance data 135 are stored in the kernel registry 140 and are maintained in persistent storage where they can be modified when desired and stored when power is turned off.

It will be appreciated that the initialization parameter data, whether static, dynamic or guidance, will vary depending on the component being initialized and the particular settings used with the component. The parameter data is also referred to herein as initialization data and initialization parameters. Exemplary parameter data may include initialization functions, register default values, hardware implementation details such as a number of implemented registers, classes of registers, etc., or other rules to guide the behavior of the processor or other interacting hardware. Each set of parameter data is associated with a processor type to which it applies.

The initialization data is pre-generated from known processor types and corresponding configuration parameters also known for selected components that interact with the processor. The initialization data can be configured in a variety of ways such as a data file, a tree, or a table. The dynamic parameter data 130, since it can be modified during run-time, can be used as override parameters in place of static parameters. By setting desired dynamic parameters 130, a user can set customized configuration settings for a particular processor to allow customized troubleshooting, to work-around known hardware problems or both. For certain types of hardware, its settings may not be known. In this case, the dynamic parameter data 130 may be loaded with best-guess values for that type of hardware.

In the illustrated embodiment, the dynamic initialization data which includes dynamic parameter data 130 and guidance data 135 is stored in a persistent storage area. One, the other or both types of data can be maintained and accessed through the kernel registry 140 of the operating system although it can be independently maintained and/or maintained through another system feature. Although not illustrated, the system may include software that allows a user to generate the initialization data by creating entries therein, storing values and associating those values or otherwise defining relationships to particular processor types.

Figure 2:
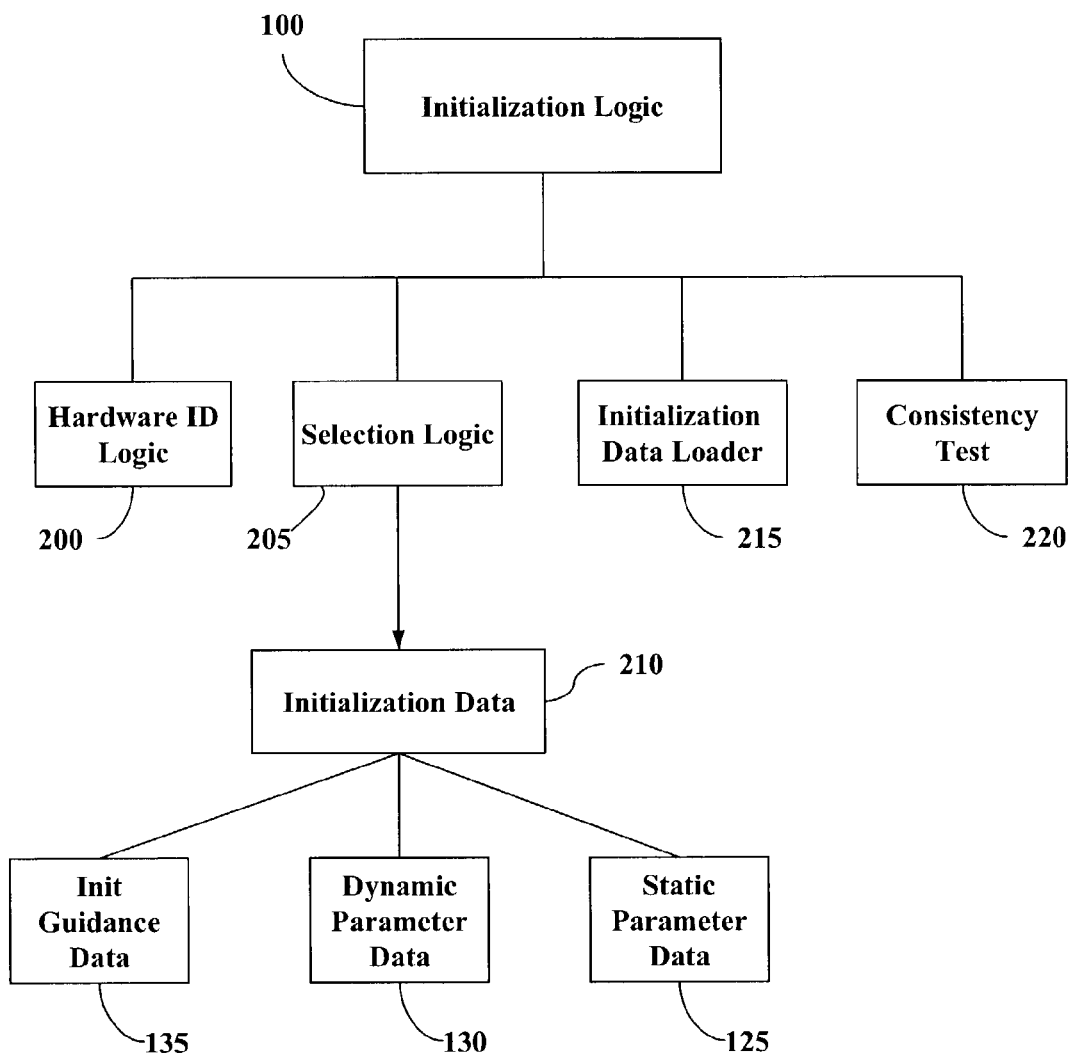
FIG. 2 is one embodiment of an initialization system.

Illustrated in FIG. 2 is one embodiment of the initialization logic 100. In this embodiment, the initialization logic 100 is embodied as software including one or more computer readable/executable instructions that cause a computer to behave in a desired manner. Although the following exemplary components are illustrated as separate elements in FIG. 2, they may or may not be physically separate computer instructions in the software. It should be well understood to those of ordinary skill in the art that the form of software is based on the preferences of the designer/programmer.

With further reference to FIG. 2, a hardware identification logic 200 is programmed to retrieve the processor identifier 115 from the processor in the system. If the identifier includes multiple levels of identification, a parsing function may be included to extract each component of the identifier. A selection logic 205 takes the identifier and determines whether that type of processor is supported. This includes scanning pre-generated initialization data 210 which includes the static parameter data 125, the dynamic parameter data 130, and may include the guidance data 135, to determine if initialization parameters have been created and stored for the processor type that correspond to the processor identifier. In other words, the selection logic 205 determines whether the processor identifier 115 is recognized by the system. The order in which the different types of initialization parameter data is scanned can be varied. In the illustrated embodiments, the static parameter data 125 is scanned and loaded (if present) before the dynamic parameter data 130. As mentioned, the dynamic parameters can be used as an override function to allow customized configuration parameters or other desired initialization settings to be used to initialize the system component 105 instead of associated static parameters. Once the initialization parameters are selected, an initialization data loader 215 initializes the system component 105 to have the new configuration such as by loading the selected parameter values into the component initialization data 120. If the selected initialization data includes an initialization function, the function is called. Another optional feature may include a consistency test routine 220 that performs a consistency test on the newly configured system component to ensure that the initialization data was properly set.

Figure 3:
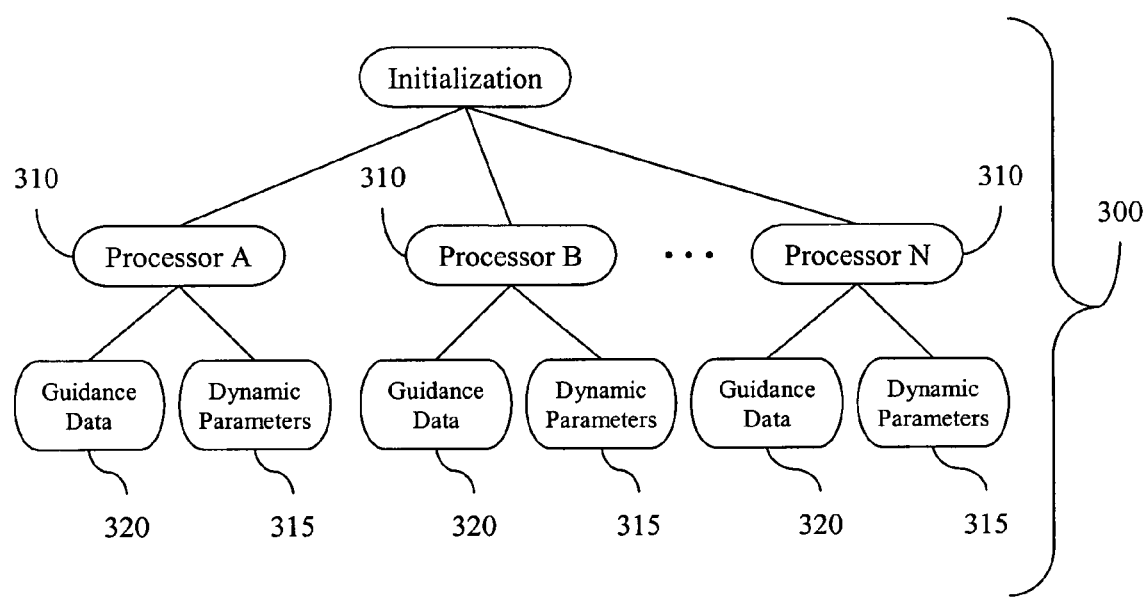
FIG. 3 is one embodiment of initialization/configuration data.

Illustrated in FIG. 3 is one embodiment of an exemplary data tree configuration 300 for the dynamic initialization data maintained in persistent storage. It will be appreciated that each tree node may have one or more child nodes and any variety of node links may be established including sibling-to-sibling links if desired. In the illustrated configuration 300, the initialization data is shown with only one level of processor identification shown as nodes 310. Of course, multiple levels of identifiers can be used as will be described below. It will be appreciated that different initialization data trees 300 can be generated for each type of system component that may need to be dynamically re-configured when a new processor or other type of hardware is installed in the system.

With further reference to FIG. 3, the initialization data 300 is pre-generated based on known processor types and known initialization parameters that are recommended for a specified system component when functioning with the corresponding processor. This information, for example, may be obtained from published and/or non-published documentation and specifications for each processor type. The initialization data is collected, loaded into the tree structure and associated with each processor type as one or more dynamic parameters 315. Since this data is maintained in persistent storage, it can be dynamically modified to take effect during the next system initialization (reboot). Another embodiment could include the ability to add or change parameters without having to re-boot the kernel. Guidance data 320 may also be defined for each processor type to guide the initialization logic in selecting parameters from the static parameter data. The guidance data 320 may identify particular initialization routines/functions (e.g. a mapping to a initialization function), which are called to perform the initialization.

Figure 4A:
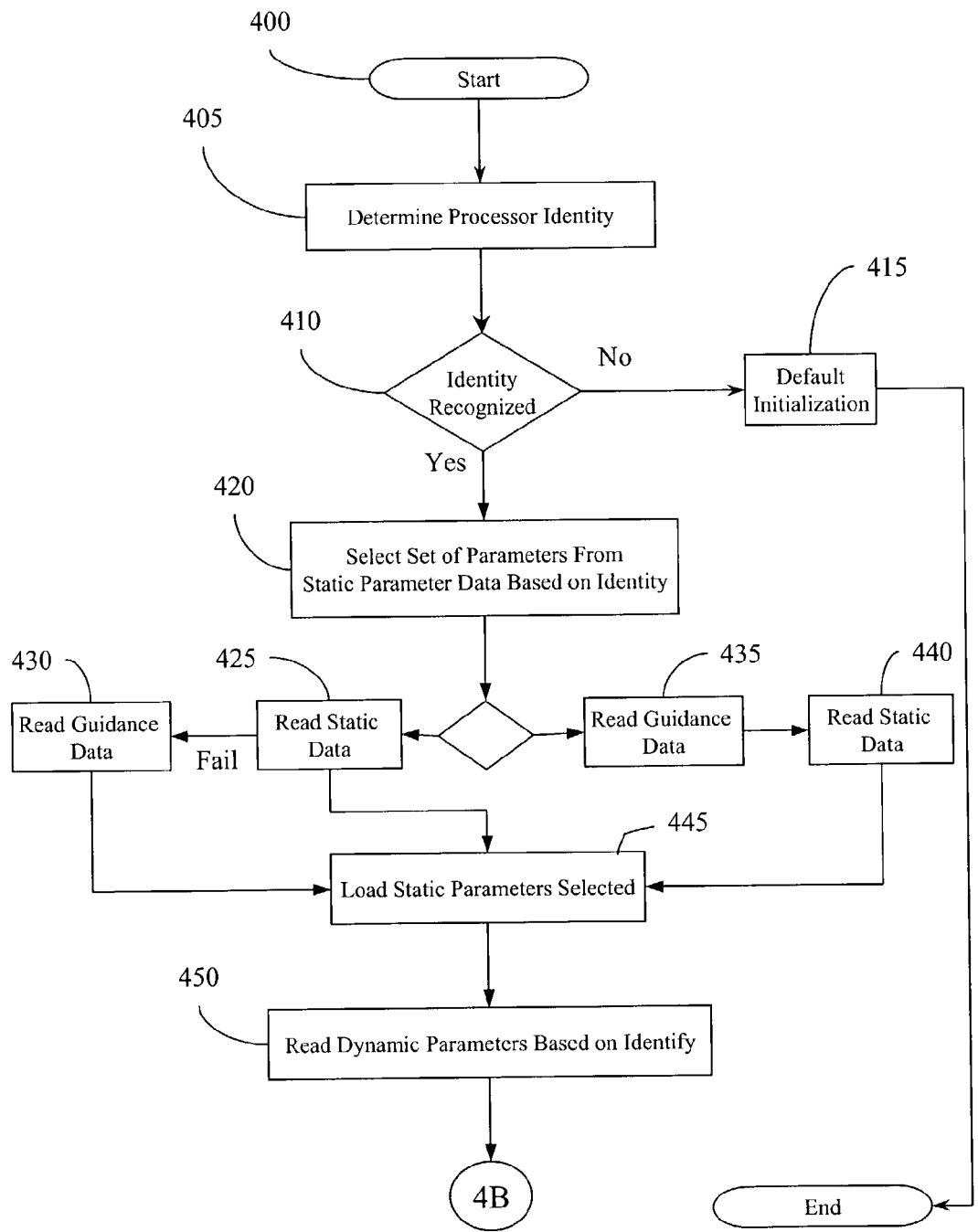
FIGS. 4A and 4B illustrate an exemplary methodology to configure a system component.

Illustrated in FIG. 4 is one embodiment of a methodology associated with the system of FIG. 1 or a similar system. The illustrated elements denote "processing blocks" and represent computer software instructions or groups of instructions that cause a computer to perform an action(s) and/or to make decisions. Alternatively, the processing blocks represent functions and/or actions performed by functionally equivalent circuits such as a digital signal processor circuit or an application specific integrated circuit (ASIC). The diagram, as well as the other illustrated diagrams, does not depict syntax of any particular programming language. Rather, the diagram illustrates functional information one skilled in the art could use to fabricate circuits, to generate computer software, or a combination of hardware and software to perform the illustrated processing. It will be appreciated that electronic and software applications may involve dynamic and flexible processes such that the illustrated blocks can be performed in other sequences different than the one shown and/or blocks may be combined or separated into additional components. They may also be implemented using various programming approaches such as machine language, procedural, object oriented and/or artificial intelligence techniques.

With reference to FIG. 4, the methodology starts at 400 with a triggering event such as the kernel or computer being rebooted, a system-generated request to initialize due to the detection of new hardware, and/or a user-generated request to initialize. After a new processor or other hardware component is installed, the identity of the processor is determined (block 405). This may include obtaining a processor identifier value embedded within the processor or stored in an external location. It may also be received from a user. It is then determined whether the processor is recognized or supported (block 410). This may include scanning the initialization data to determine if parameters exist that have been associated with an identifier that corresponds to the processor identifier.

If there is a match, the processor is supported. If no initialization data matches the processor identifier, the processor is not supported. In this case, a default initialization (block 415) may be performed such as a static initialization function or optionally, an error condition is generated and the process ends. If the processor is supported (e.g. a matching node exists), the process attempts to select and retrieve any configuration parameters that are associated with that processor identity (block 420). Here, the process can choose two different routes. The first reads the static parameter data (block 425) and then, if the static data is not present, it reads the guidance data (block 430). The second route reads the guidance data (block 435) and then reads the static parameter data (block 440). If the data exists, the static parameters are selected and loaded (block 445), otherwise no parameters are loaded at this time. After loading the static parameters (if any), dynamic parameter data is searched and read based on the processor identity (block 450). Optionally, the process may skip reading the dynamic parameters and simply use the static parameters.

Figure 4B:
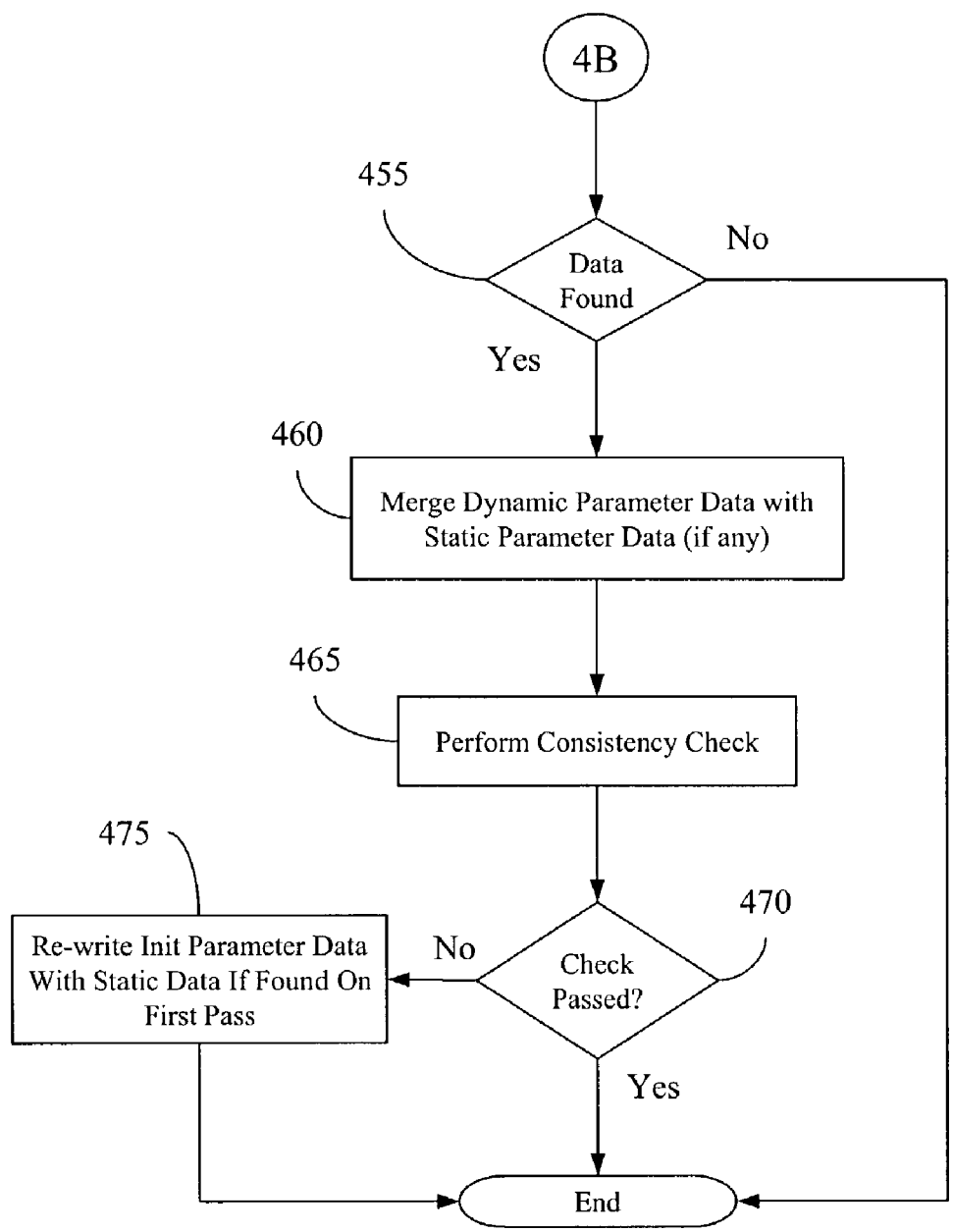

The diagram then continues on FIG. 4B. Again, there may or may not be any dynamic parameter data for a particular processor (block 455). If the dynamic parameter data for this processor is found, the dynamic parameters are merged with (e.g. loaded on top of) any previously loaded static parameters (block 460). It will be appreciated by one of ordinary skill that there are many ways of merging data. If no static data was loaded, the process loads the dynamic parameter data onto a blank slate of parameters. The dynamic parameter data will overwrite any parameters already written to the component being initialized.

After loading the dynamic parameter data, a consistency check is performed to determine if the dynamic data merged well with any pre-existing static data (block 465). If no static data was loaded, then the check determines if a minimal required set of parameters have been assigned. If the consistency check fails (block 470), meaning the dynamic parameter data is corrupt or incorrect, the initialization parameters are re-written with using only the static parameter data if it was initially found (block 475). Otherwise, the component remains uninitialized. If the consistency check passes (block 470), the component has been successfully initialized. In this manner, a system component 105 can be dynamically configured for a new processor by reading data from storage and without having to rebuild or patch the kernel with hardcoded configuration settings.

Figure 5:
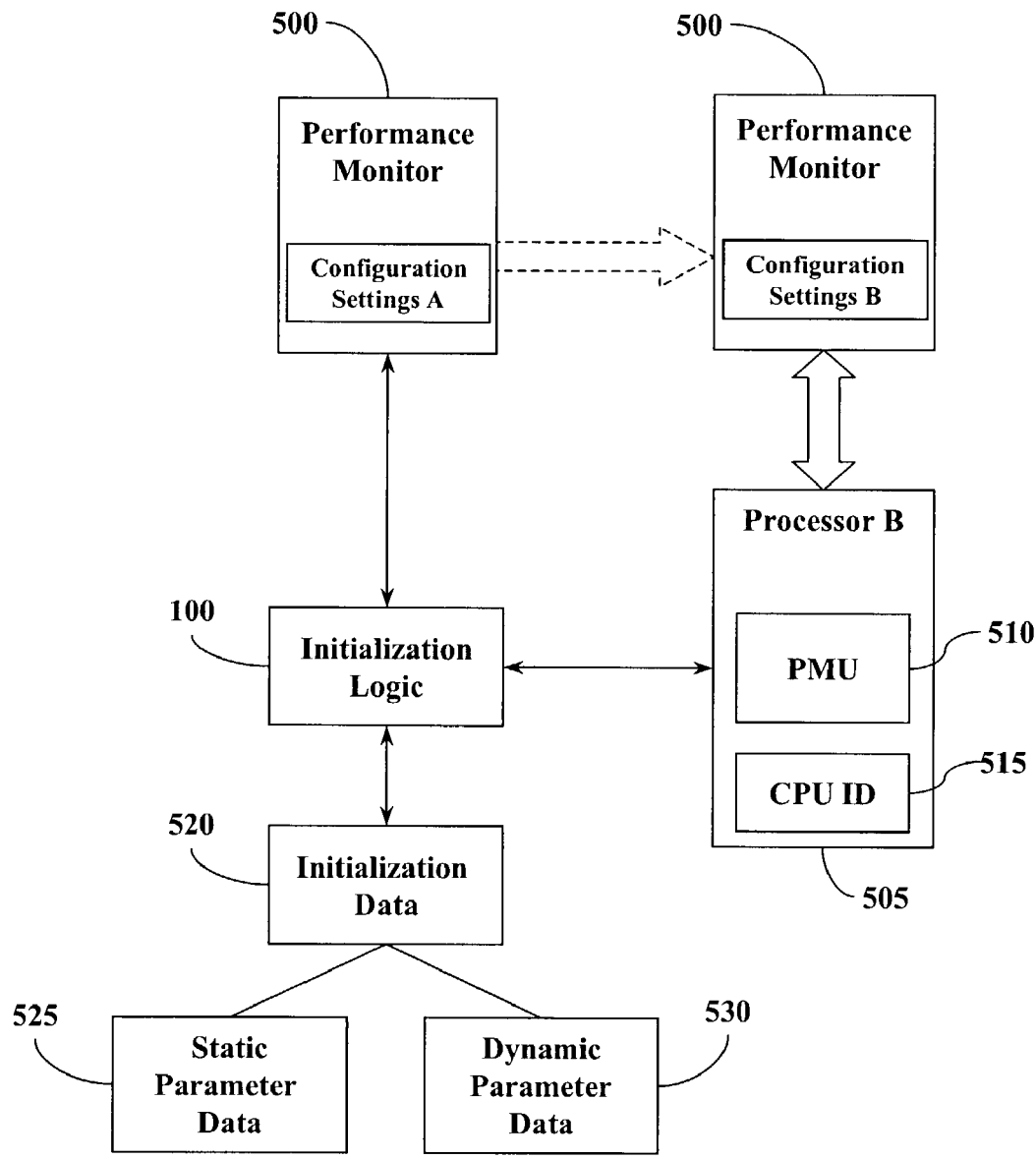
FIG. 5 is another embodiment of an initialization system for a performance monitor component.

Illustrated in FIG. 5 is another embodiment of an initialization system that dynamically configures a performance monitor 500 which is used as an exemplary system component 105 from FIG. 1. An exemplary performance monitor 500 is "perfmon" of the HP-UX operating system. "Perfmon" is a system call used from a monitoring user application which instructs the system to allocate and configure memory for use in performance monitoring. This is performed, for example, by using user-level code within the application that requests access to system registers and/or counters used for performance monitoring. In the example below, the system registers/counters are from a performance monitoring unit (PMU) embedded with a central processing unit.

The performance monitor 500 is initially configured with configuration settings "A" that are associated with a processor "A" (not shown). When processor "A" is replaced with processor "B" 505, the performance monitor 500 may no longer be appropriately configured to interact with the processor. Generally speaking, the initialization logic 100 attempts to dynamically reconfigure the performance monitor 500 to have configuration settings "B" without having to hardcode and recompile the new settings into the kernel as static parameters. With new settings, if correct, the performance monitor 500 may be able to optimally interact and take full advantage of the capabilities of the processor "B".

An exemplary processor "B" may include the Itanium or McKinley model processors made by Intel (from the Itanium Processor Family). These processors include an embedded performance monitoring unit (PMU) 510 and a register that stores a processor identifier such as a CPU ID register 515. With this type of processor, the processor identifier has two levels of identification, the first being a processor family name and the second being a model identifier. Thus, for a particular family (Itanium or McKinley), there may be zero, one or more models supported. For each family and/or model, the PMU 510 can vary, for example, by having different register definitions and other parameters that may affect communication between the performance monitor component 500 if it is not configured accordingly. As such, the initialization logic 100 obtains the processor identifier and matches the associated configuration settings from pre-generated initialization data 520 which includes at least static parameter data 525 and dynamic parameter data 530. The performance monitor 500 is then reconfigured with those configuration settings shown as configuration settings "B". Similar to the system in FIG. 1, the static parameter data 525 is statically compiled into the performance monitor 500 and the dynamic parameter data 530 is stored in persistent storage and may be dynamically modified.

Figure 6:
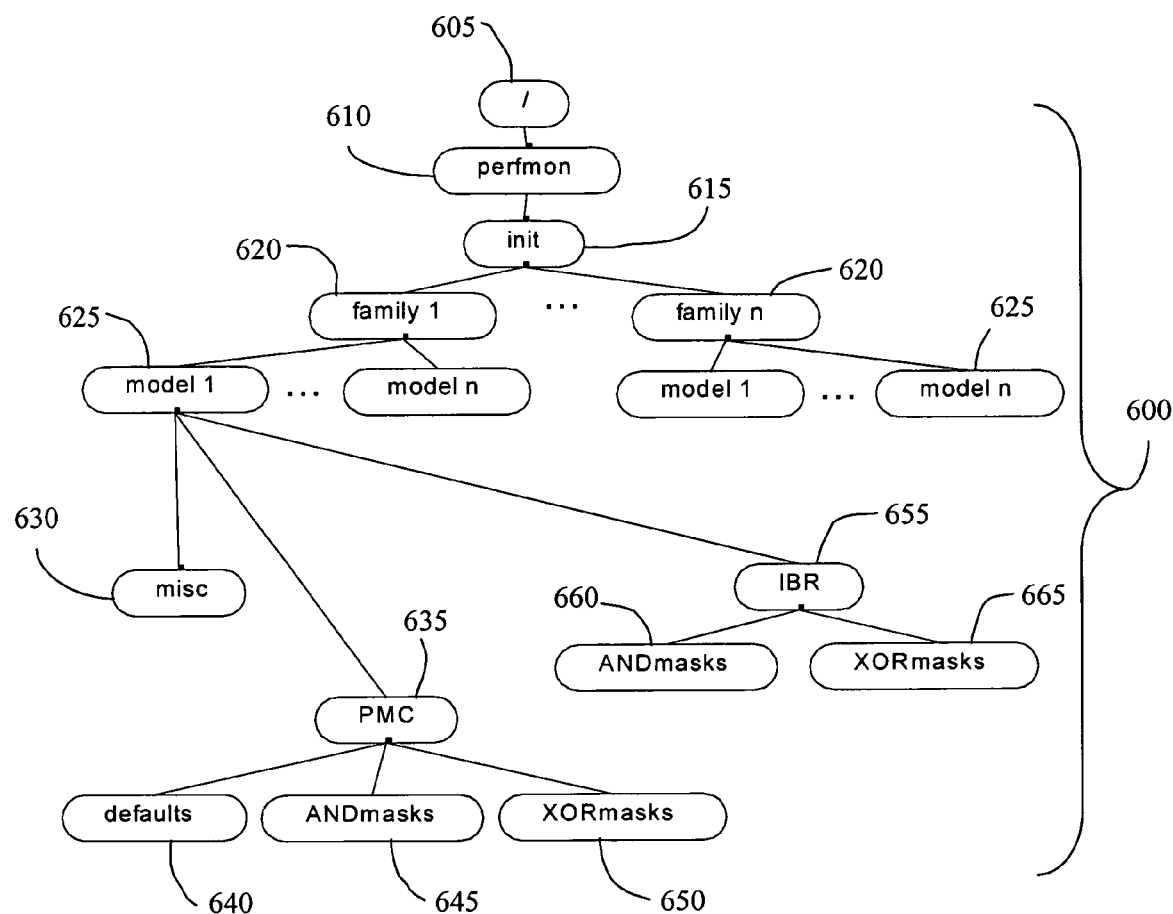
FIG. 6 is another embodiment of initialization/configuration data.

Illustrated in FIG. 6 is an alternative initialization data tree 600. In this embodiment, it is assumed that the initialization data 600 is part of the kernel registry data although it may be maintained separately. The initialization data may be stored under some designated root node "/" 605. The next level in the tree may identify the type of system component that the current initialization data is associated with. In this case, the initialization data is for perfmon 610. The perfmon node 610 is the root node for perfmon information maintained in the kernel registry tree. The perfmon node 610 may also have one or more types of data maintained for it under separate nodes, one of which may be initialization data represented by an "init" node 615.

In this embodiment, the data includes two levels of identifiers, namely, a family level identifier (nodes 620) and a model level identifier (nodes 625). It will be appreciated that each family of processors may include zero or more model numbers. The family nodes 620 are named based on the family ID number of the Itanium processor. One implementation of this number is in hexadecimal notation but, of course, can be any combination of desired alpha-numeric characters or other identifiers. The family number corresponds to the family ID retrieved from the CPU ID 505 register. For example, the Itanium processor family has a current value of "seven". The model nodes 625 are named based on the model ID number which is also, for example, in hexadecimal notation. This number corresponds to the model ID retrieved from the CPU ID register 515 from the processor.

With further reference to FIG. 6, the child nodes connected to the "model 1" node 625 are particular to the Itanium processor family and may not be relevant outside that scope. Therefore, it will be appreciated that other types of configuration data may be stored for each processor model as well as any number of nodes.

With further reference to FIG. 6, exemplary configuration data is shown as nodes extending from the "model 1" node 625 that contain different types of configuration data. The data stored in these nodes are to be used to configure perfmon when the system has a processor of the type "family 1" and "model 1". As stated previously, besides being actual data values, the configuration data/parameters may identify particular initialization functions (e.g. a mapping to an initialization function) which are called to perform the initialization.

Looking at the nodes, the miscellaneous (misc) node 630 may hold various values that describe the PMU 510 implementation. For example, it may hold values used for loop counters. When a user writes data to performance monitoring counter (PMC) registers of the PMU, software should know how many registers exist. The miscellaneous node 630 may also contain information that classifies registers, for example, which registers affect what external behaviors. This may include setting write-access to only certain classes or other types of access privileges.

With further reference to FIG. 6, a performance monitoring counter (PMC) node 635 contains information relating to the PMC register treatment. For example, a defaults node 640 may contain configuration values to be programmed into the PMC registers if no values are specified by a user of perfmon. An ANDmasks node 645 and an XORmasks node 650 contain data that checks the correctness of the input data. For example, the masks are used to check that bits that should be "0" are "0" and/or checks that bits that should be "1" are "1". An instruction breakpoint register (IBR) node 655 contains information relating to the IBR register treatment for the performance monitoring unit 510. This information also may contain ANDmasks 660 and XORmasks node 665. Of course, other types of registers may exist and configuration data specific to them can be stored in the initialization data 600. The instruction breakpoint register is used during debugging. In a debug mode, these registers allow breakpoints to be set to let the debugger interrupt and stop executing code to save its state. By setting a mode bit in these registers, perfmon allows the framing of an area of the executable so that it can be profiled, when they are not being used for debugging. Once the initialization data 600 is defined and generated, dynamic initialization of the performance monitor component 500 can be performed for various types of processors as described below.

Figure 7:
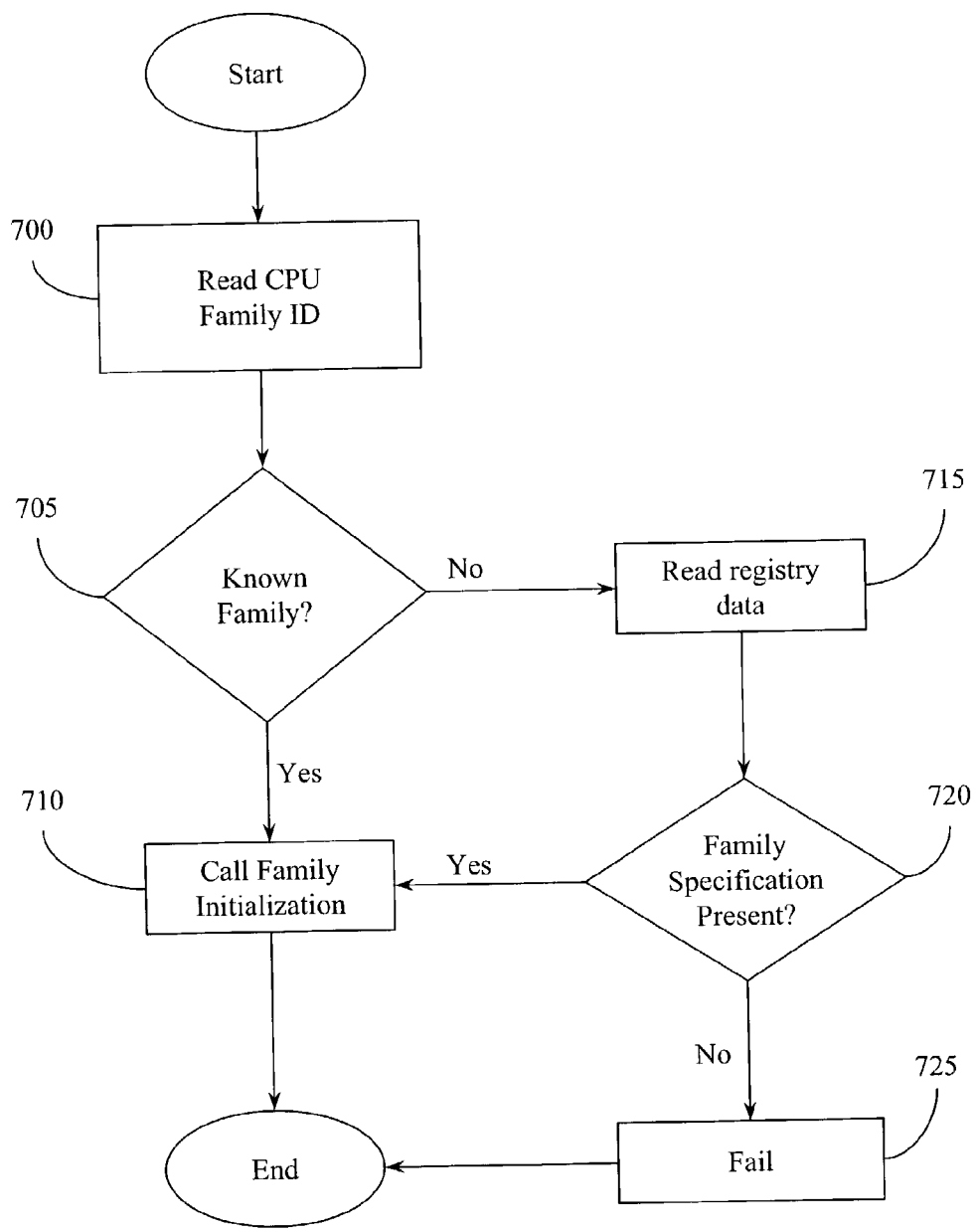
FIG. 7 is one embodiment of a general initialization phase of the exemplary system of FIG. 5.

Illustrated in FIG. 7 is one embodiment of a methodology for initializing the performance monitor 500 shown in FIG. 5. This embodiment will be described using a two level processor identifier that includes a family ID and a model ID as shown in FIG. 6 and as used by the Itanium processor family. Similar considerations for implementing this methodology also applies as those stated for FIG. 4.

Shown in FIG. 7 is a general initialization phase which is a high level initialization that occurs after a new processor is installed in the system. In this embodiment, the initialization data is maintained in persistent storage and is part of the kernel registry. After initialization begins, an identity of the processor is determined by reading the CPU family ID (block 700) from the processor which may be stored in a special register. The family name is extracted from the processor identifier and the process determines whether the family is recognized (block 705). This includes scanning the static parameters to determine if initialization data has been created for that family. If it has, then a family initialization routine is called (block 710) which is shown in FIG. 8.

If the family is not recognized, the kernel registry data is read (block 715) to determine if a node with that family ID has been created. If it has and if a family specification exists that includes a mapping to a known initialization routine/function (block 720), then the family initialization is called. If it is not present, the initialization fails (block 725) and an error message may be generated. It will be appreciated that in the initialization data, that there may be a one-to-one mapping of family ID's to a family initialization routine, however, it may be implemented with something other than a one-to-one mapping. For example, multiple family ID's can be mapped to the same initialization routine/function.

Figure 8:
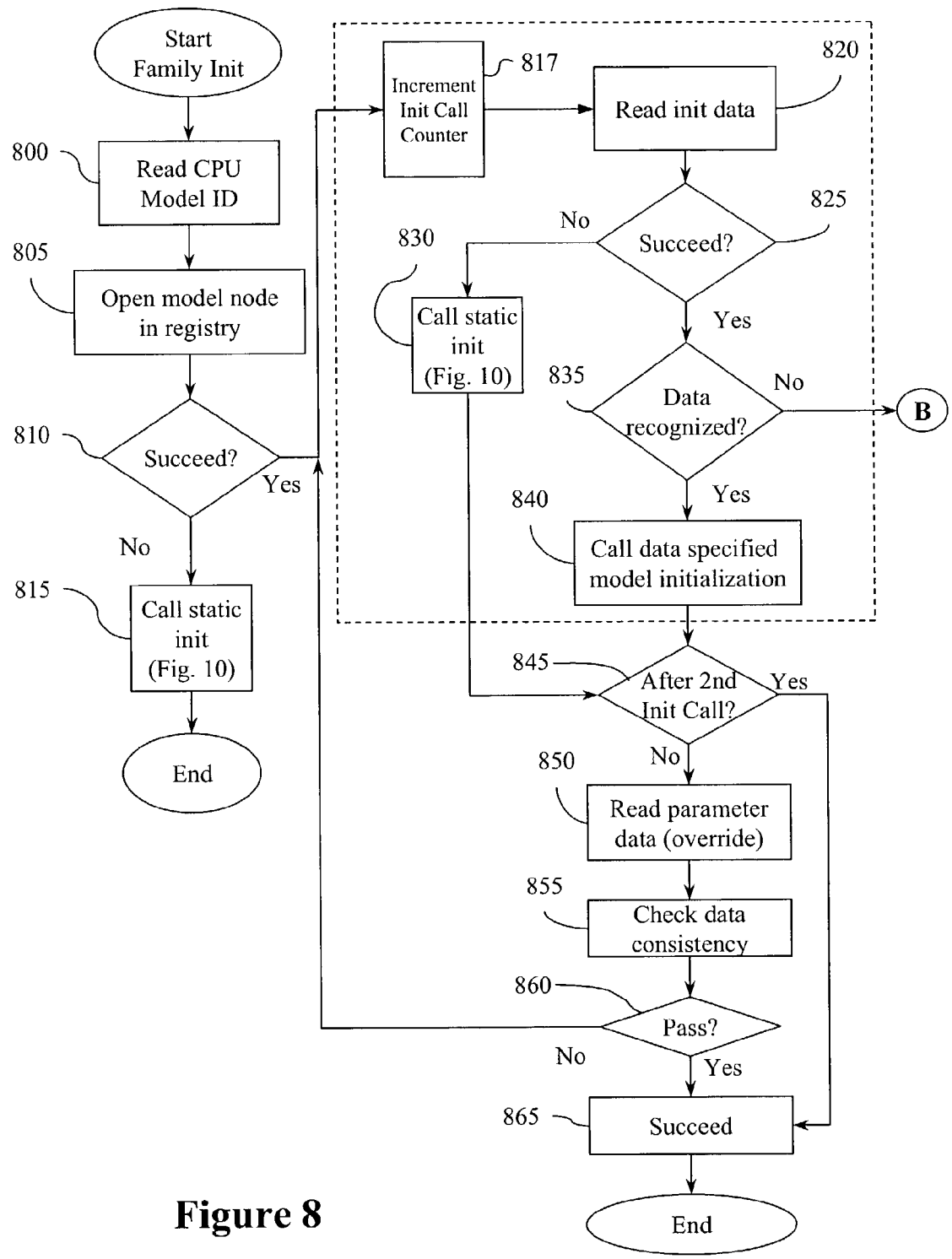
FIG. 8 is an exemplary methodology for a family initialization called from FIG. 7.

With reference to FIG. 8, one embodiment of the family initialization process (block 710 from FIG. 7) is shown. The illustrated methodology is called after the family ID is recognized (known or found in registry) and includes recognizing a model ID and reading of initialization data. As will be described below, the illustrated embodiment includes actions taken if certain initialization data does and/or does not exist. It will be appreciated that these actions and others shown therein may be optional and/or differently implemented based on the desires of a designer/programmer.

After starting, the model ID is read from the processor identifier obtained from the processor ID register (block 800). As indicated above, the processor identifier in this embodiment includes a family ID and a model ID. Then a node in the kernel registry that corresponds to the model ID is opened (block 805) to obtain initialization data associated with this family, model ID. If the node does not exist, this step does not succeed (block 810), meaning that there is no initialization data provided. In this case, a static initialization is called (block 815) which may include a generic initialization of whatever information is known for this model even though the registry initialization data does not exist. An exemplary static initialization is shown in FIG. 10.

If the model node exists (block 810), an initialization call counter is then incremented to track the number of initialization calls made during the initialization process (block 817). Initialization data is read from the node (block 820). If the read is unsuccessful, meaning, that the initialization data for that node does not exist (block 825), the static initialization routine is called (block 830). Thus if the test fails completely, either by not being able to open the node (e.g. the node does not exist) or the data is not present (e.g. the node exists but no data was loaded), the process calls the static initialization function (block 830) which is shown in FIG. 10. If the determination succeeds at block 825, then the process verifies that the initialization data is one that is recognized, meaning, that it maps to a known function or known model initialization (block 835). If it is recognized, a data specified model initialization function is called and executed (block 840) which performs the initialization of perfmon. If it is not recognized, for example, where the data is not mapped to anything, the process goes to connector point "B" which continues on FIG. 9.

With reference to FIG. 9, the methodology of FIG. 8 continues in the condition that the initialization data is not recognized (block 835). When the data is not recognized, dynamic parameter data is read from the registry (block 900). The dynamic parameter data will actually populate the data structures of perfmon. However, since no static initialization has been performed, the data is checked for completeness and consistency (block 905). Here, the parameter data (static, dynamic, or both) is checked to ensure that certain values that need to be defined are defined while other values may be omitted.

For example, some default values may be assumed as "zero" if they are not specified. However, certain values such as the number of registers may need to be specified or this test (block 910) will fail because the parameter data is not a complete set. In this case, the static initialization function is called (block 920) which is shown in FIG. 10. The consistency part of the test determines which values of data are related and verifies that those relationships make sense. If the consistency check passes, a mapping to the latest model ID is created (block 925). A message may also be output to the user identifying which processor mapping will be used. The initialization is then indicated to succeed (block 930) and ends.

Now returning to FIG. 8 and block 845. At this point, the process has called or has attempted to call some sort of initialization (e.g., block 840 and/or block 830). At block 845, a check is made as to the number of passes the initialization process has made. This is determined from the initialization call counter that is kept. If after a first pass, flow continues to block 850 where dynamic parameter data is read. In one embodiment, the dynamic parameter data is defined in the kernel registry. The dynamic parameter data will then be merged with the static parameter data (if any) previously read, and will override any existing values.

The initialization data is then checked for consistency (block 855). Although not shown, a concurrent test may be made to determine if an initialization function has been called. If it has not, the initialization fails unless other desired actions are taken. An example of when an initialization function would not be called is when the process passes through the static initialization block 830 and the processor model is not recognized/supported (block 1010, FIG. 10). If an initialization has been called and the data passes the consistency check (block 860), the initialization succeeds (block 865) and ends.

If the data is inconsistent (block 860), the initialization could be made to fail and end if no more attempts to fix it are desired. However, if the process did manage to initialize the first time through but the data comes out inconsistent, then make another pass by returning to the read initialization data block 820. Here, the initialization call counter may be incremented (block 817) to keep track of the number of passes for the decision block 845 so that the parameter data is not read again at block 850.

Thus at block 845, if after a second initialization pass through the dotted box area, the process branches to a succeed condition (block 865) and ends. Thus, if flow came from the static initialization, the kernel defaults will be used and the override parameters of the dynamic parameter data (block 850) are ignored because they were inconsistent during the first pass (block 855).

Illustrated in FIG. 10 is an exemplary methodology for the static initialization routine from FIG. 8. The model identifier is checked (block 1000) and it is determined whether it is supported/recognized (block 1005). As described previously, this may include scanning the static initialization data to determine if the model identifier is known. If no static parameters are found for the model, the initialization fails (block 1010). If initialization data is found, an initialization function is called which loads the static parameters into perfmon (block 1015). It will be appreciated that block 1015 may also be the starting point for the "call data specified model initialization" block 840 in FIG. 8. Thus, configuration parameters for perfmon are set (block 1020) and a mapping may then be created to the model identifier (block 1025). The initialization then succeeds (block 1030) and ends.

By initializing model specific values in perfmon using dynamic parameter data stored in persistent memory and/or storage, more flexibility is available in the system. For example, using a kernel registry "patch" that changes stored initialization data in persistent storage, additional perfmon support can be added for new processor models without having to perform a kernel rebuild/reinstall/upgrade. Also possible is the ability to override static kernel defaults by setting customized configuration parameters in the dynamic initialization data. This allows for customized troubleshooting and/or allows a user to work around hardware problems if they exist.

An exemplary application may be as follows. An engineer wishes to test the functionality of a new chip using perfmon. Configuration parameters may be created and stored in the kernel registry as dynamic parameter data and associated for that chip. The initialization logic could then re-configure perfmon with that dynamic data to get perfmon initialized and running without having to re-build the kernel with static initialization parameters to accommodate the new chip. This helps speed up the development process. By having perfmon enabled early in the development cycle for a product with a new chip, it allows monitoring and tuning of the kernel performance and other applications on the system before the product is made commercially available.

It will be appreciated that the above described embodiments may be implemented as a software product stored on a computer readable medium or on a computer such as a personal computer accessing such software product from internal drives, external drives (e.g., network or other), via the internet, or other means (see FIG. 11). The medium may include magnetic storage, optical storage, digital storage, an electronic memory and others as known in the art.

I claim:

1. A system of dynamically initializing a computer system component to interact with a processor, the system comprising:
   hardware identification logic that determines a processor identifier associated with the processor;
   static parameter data that includes static initialization parameters that are compiled into the computer system component;
   dynamic parameter data being dynamically changeable and including one or more sets of dynamic initialization parameters where each set of dynamic initialization parameters corresponds to an associated processor identifier;
   selection logic to select one set of dynamic initialization parameters from the dynamic parameter data that corresponds to the processor identifier of the processor; and
   an initialization data loader that initializes the computer system component by loading the selected dynamic initialization parameters and static initialization parameters into component initialization data.

2. The system as set forth in claim 1 wherein the processor identification includes at least one level of identification.

3. The system as set forth in claim 2 wherein the at least one level of identification includes one or more processor family names and one or more model names associated with each of the one or more processor family names.

4. The system as set forth in claim 1 wherein the dynamic parameter data includes a pre-generated tree structure stored in a persistent storage.

5. The system as set forth in claim 1 wherein the dynamic parameter data includes one or more default initialization parameters to be used as the selected initialization routine when a corresponding initialization routine is not found.

6. The system as set forth in claim 1 further including persistent storage for storing the dynamic parameter data.

7. The system as set forth in claim 1 further including a consistency tester for testing the component initialization data.

8. The system as set forth in claim 1 wherein the computer system component is a performance monitoring component.

9. The system as set forth in claim 1 wherein the computer system component is a component of a kernel.

10. A computer readable medium including one or more computer executable instructions for configuring a performance monitoring component of a computer system, where the performance monitoring component is configured to communicate with a first processor but is to communicate with a second processor, the software product comprising:
    first computer executable instructions that cause a computer to select one or more dynamic configuration parameters from a pre-generated set of dynamic configuration data based on an identity of the second processor; and
    second computer executable instructions that cause a computer to re-configure the performance monitoring component with the selected one or more dynamic configuration parameters to improve communication with the second processor.

11. The computer readable medium as set forth in claim 10 further including one or more third computer executable instructions that cause a computer to determine the identity of the second processor.

12. The computer readable medium as set forth in claim 10 further including one or more fourth computer executable instructions that cause a computer to re-configure the performance monitoring component based on a default configuration if the identity of the second processor is unrecognized.

13. The computer readable medium as set forth in claim 10 wherein the pre-generated set of dynamic configuration data comprises a one or more groups of dynamic configuration parameters each being associated to one or more processor identities.

14. A method of configuring a performance monitor of a computer that has a processor, where the performance monitor is configured to communicate with the processor based on a set of static configuration parameters, the method comprising:
    obtaining a processor identifier that identifies the processor;
    searching pre-generated dynamic configuration data having one or more dynamic configuration parameters associated with one or more types of processors, where the dynamic configuration parameters are dynamically modifiable;

selecting a set of dynamic configuration parameters from the pre-generated dynamic configuration data that is associated with the processor identifier;

dynamically re-configuring the performance monitor with the set of dynamic configuration parameters by overwriting corresponding values of the static configuration parameters.

15. The method of configuring as set forth in claim 14 further including determining a family identifier and a model identifier from the processor identifier.

16. The method of configuring as set forth in claim 14 further including storing the pre-generated dynamic configuration data in a persistent storage.

17. The method of configuring as set forth in claim 14 wherein the performance monitor initially includes a first configuration and where the re-configuring changes the first configuration to a second configuration.

18. The method of configuring as set forth in claim 14 wherein the one or more dynamic configuration parameters are stored as one or more mappings to initialization functions.

19. A system for initializing a system component comprising:

static initialization data including static initialization parameters that are compiled into a kernel from an operating system associated with the system component;

dynamic initialization data including one or more dynamic initialization values that are recommended settings for the system component based on a selected type of hardware that is to interact with the system component;

one or more first computer executable instructions that cause a computer to define one or more override initialization values in the dynamic initialization data, the override initialization values being customized values defined by a user; and one or more second computer executable instructions that cause the computer to dynamically initialize the system component for the selected type of hardware using one or more override initialization values from the dynamic initialization data over corresponding static initialization data or corresponding dynamic initialization values without having to re-build the kernel from the operating system.

20. The system as set forth in claim 19 where the system component is a performance monitor and the associated type of hardware is a processor.

21. The system as set forth in claim 19 wherein the dynamic initialization data includes a tree structure having nodes for storing the one or more initialization values in a hierarchical structure.

22. The system as set forth in claim 19 wherein the one or more second computer executable instructions that cause a computer to dynamically initialize includes an initialization logic that is responsible for dynamically initializing the system component with configuration settings that are specific to a processor in a computer system.

23. The system as set forth in claim 19 wherein the system component includes static parameter data that initializes the system component, and one or more second computer executable instructions that cause a computer to overwrite the static parameter data with the one or more override initialization values.

24. A computer system comprising:

a processor and a system component;

hardware identification logic that determines a processor identifier associated with the processor;

static parameter data that includes static initialization parameters that are compiled into the system component;

dynamic parameter data being dynamically changeable and including one or more sets of dynamic initialization parameters where each set of dynamic initialization parameters corresponds to an associated processor identifier;

selection logic to select one set of dynamic initialization parameters from the dynamic parameter data that corresponds to the processor identifier of the processor; and an initialization data loader that initializes the system component by loading the selected dynamic parameter data and static parameter data into component initialization data.

25. A computer system comprising:

static initialization data including static initialization parameters that are compiled into an operating system kernel associated with a system component;

dynamic initialization data including one or more dynamic initialization values that are recommended settings for the system component based on a selected type of hardware that is to interact with the system component;

one or more first computer executable instructions that cause the computer system to define one or more override initialization values in the dynamic initialization data, the override initialization values being customized values defined by a user; and one or more second computer executable instructions that cause the computer system to dynamically initialize the system component for the selected type of hardware using one or more override initialization values from the dynamic initialization data over corresponding static initialization data or corresponding dynamic initialization values without having to re-build the operating system kernel.

26. A system for configuring a performance monitor of a computer that has a processor means, where the performance monitor is configured to communicate with the processor means based on a set of static configuration parameters, the method system comprising:

means for obtaining a processor identifier that identifies the processor means;

means for searching pre-generated dynamic configuration data having one or more dynamic configuration parameters associated with one or more types of processor means, where the dynamic configuration parameters are dynamically modifiable;

means for selecting a set of dynamic configuration parameters from the pre-generated dynamic configuration data that is associated with the processor identifier;

means for dynamically re-configuring the performance monitor with the set of dynamic configuration parameters including means for overwriting corresponding values of the static configuration parameters.

27. A system of dynamically initializing a component to interact with an electronic device, the system including:

hardware identification logic that retrieves one or more device identifiers associated with the electronic device;

static parameter data that includes one or more sets of static initialization parameters that are compiled into the component, where each set of static initialization parameters correspond to at least one device identifier;

selection logic to select at least one set of static initialization parameters from the static parameter data that corresponds to the one or more retrieved device identifiers; and an initialization data loader that initializes the component by loading the selected at least one set of static initialization parameters into component initialization data.

28. The system set forth in claim 27, further including:

guidance data to guide the selection logic in selection of the static parameter data that corresponds to the one or more retrieved device identifiers.

29. The system set forth in claim 28 wherein the guidance data extends the use of at least one set of static initialization parameters to one or more electronic devices with which the corresponding static initialization parameters were not previously associated.

30. The system set forth in claim 28 wherein the selection logic scans the guidance data to select the static parameter data that corresponds to the one or more retrieved device identifiers.

31. The system set forth in claim 27, further including:

dynamic parameter data including one or more sets of dynamic initialization parameters where each set of dynamic initialization parameters corresponds to at least one device identifier;

wherein the selection logic selects at least one set of static initialization parameters and dynamic initialization parameters from the static parameter data and dynamic parameter data that corresponds to the one or more retrieved device identifiers and the initialization data loader initializes the component by loading the at least one set of selected static initialization parameters and dynamic initialization parameters into component initialization data.

32. The system set forth in claim 31 wherein at least a portion of dynamic initialization parameters selected by the selection logic overrides corresponding static initialization parameters selected by the selection logic in the component initialization data.

33. The system set forth in claim 31 wherein at least a portion of dynamic initialization parameters selected by the selection logic supplements static initialization parameters selected by the selection logic in the component initialization data.

34. The system set forth in claim 31 wherein the selection logic scans the dynamic parameter data to select the static parameter data that corresponds to the one or more retrieved device identifiers.

35. The system set forth in claim 27 wherein the selection logic scans the sets of static initialization parameters to select the static parameter data that corresponds to the one or more retrieved device identifiers.

36. A system of dynamically initializing a component to interact with an electronic device, the system comprising:

hardware identification logic that retrieves one or more device identifiers associated with the electronic device;

dynamic parameter data including one or more sets of dynamic initialization parameters where each set of dynamic initialization parameters corresponds to at least one device identifier;

selection logic to select at least one set of dynamic initialization parameters from the dynamic parameter data that corresponds to the one or more retrieved device identifiers; and an initialization data loader that initializes the component by loading the at least one set of selected dynamic parameter data into component initialization data.

37. The system set forth in claim 36, further including:

static parameter data that includes static initialization parameters that are compiled into the component;

wherein the initialization data loader initializes the component by loading the at least one set of selected dynamic parameter data and static parameter data into component initialization data.

38. The system set forth in claim 37 wherein at least a portion of dynamic initialization parameters selected by the selection logic overrides corresponding static initialization parameters in the component initialization data.

39. The system set forth in claim 37 wherein at least a portion of dynamic initialization parameters selected by the selection logic supplements static initialization parameters in the component initialization data.

40. The system set forth in claim 37 wherein the selection logic scans the dynamic parameter data to select the static parameter data that corresponds to the one or more retrieved device identifiers.

41. A system of dynamically initializing a kernel to interact with a processor, the system including:

hardware identification logic that retrieves one or more processor identifiers associated with the processor;

static parameter data that includes one or more sets of static initialization parameters that are compiled into the kernel, where each set of static initialization parameters correspond to at least one processor identifier;

dynamic parameter data including one or more sets of dynamic initialization parameters where each set of dynamic initialization parameters corresponds to at least one processor identifier;

selection logic to select at least one set of static initialization parameters and dynamic initialization parameters from the static parameter data and dynamic parameter data that corresponds to the one or more retrieved processor identifiers;

guidance data to guide the selection logic in selection of the at least one set of static initialization parameters and dynamic initialization parameters that correspond to the one or more retrieved processor identifiers; and an initialization data loader that initializes the component by loading the selected at least one set of static initialization parameters and dynamic initialization parameters into component initialization data;

wherein the selection logic scans the sets of static initialization parameters, sets of dynamic initialization parameters, and guidance data to select the at least one set of static initialization parameters and dynamic initialization parameters that corresponds to the one or more retrieved processor identifiers.

* * * * *

UNITED STATES PATENT AND TRADEMARK OFFICE
CERTIFICATE OF CORRECTION

PATENT NO. : 6,981,135 B1  Page 1 of 1
APPLICATION NO. : 10/211611
DATED : December 27, 2005
INVENTOR(S) : Barrett Alan Trask It is certified that error appears in the above-identified patent and that said Letters Patent is hereby corrected as shown below:

In column 14, line 47, in Claim 26, delete "method".

In column 16, line 24, in Claim 40, delete "claim 37" and insert -- claim 36 --, therefor.

Signed and Sealed this

Sixteenth Day of June, 2009

JOHN DOLL
*Acting Director of the United States Patent and Trademark Office*